United States Patent
Westphal

(10) Patent No.: US 9,906,436 B2
(45) Date of Patent: Feb. 27, 2018

(54) SCALABLE NAME-BASED CENTRALIZED CONTENT ROUTING

(71) Applicant: Futurewei Technologies, Inc., Plano, TX (US)

(72) Inventor: Cedric Westphal, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 177 days.

(21) Appl. No.: 14/451,738

(22) Filed: Aug. 5, 2014

(65) Prior Publication Data

US 2015/0039784 A1    Feb. 5, 2015

Related U.S. Application Data

(60) Provisional application No. 61/862,320, filed on Aug. 5, 2013.

(51) Int. Cl.
*G06F 15/173* (2006.01)
*H04L 12/725* (2013.01)
(Continued)

(52) U.S. Cl.
CPC ......... *H04L 45/306* (2013.01); *H04L 45/42* (2013.01); *H04L 45/44* (2013.01); *H04L 45/54* (2013.01);
(Continued)

(58) Field of Classification Search
CPC ..... H04L 45/306; H04L 45/54; H04L 45/742; H04L 45/7453; H04L 45/64; H04L 45/42; H04L 45/44
See application file for complete search history.

(56) References Cited

U.S. PATENT DOCUMENTS

2006/0294311 A1*  12/2006  Fu ................. G06F 17/30902
                                                       711/118
2009/0037960 A1*  2/2009  Melby ............... H04L 65/4084
                                                       709/231
(Continued)

FOREIGN PATENT DOCUMENTS

EP   2562978 A1 *  2/2013  ............ H04L 45/54

OTHER PUBLICATIONS

Zhang et al., "Named Data Networking (NDN) Project", http://named-data.net/techreports.html, Accessed: Oct. 31, 2010, Accessed: Apr. 12, 2016.*

(Continued)

*Primary Examiner* — Nam Tran
(74) *Attorney, Agent, or Firm* — Conley Rose, P.C.

(57) ABSTRACT

A network element (NE) comprising a receiver configured to receive a content request message from a client node via a network, wherein the content request message comprises an identifier of a data object, a memory configured to store a content routing table comprising local routing entries for popular data objects, and a content indicator indicating less popular data objects that are not associated with the local routing entries, a processor coupled to the memory and configured to check the content routing table for an entry associated with the requested data object, and check the content indicator for a match between the requested data object and the less popular data objects when the content routing table does not comprise the entry, and a transmitter coupled to the processor and configured to send a route request message to a network controller when the content indicator check returns a positive match.

18 Claims, 6 Drawing Sheets

(51) Int. Cl.
  *H04L 12/741*  (2013.01)
  *H04L 12/717*  (2013.01)
  *H04L 12/721*  (2013.01)
  *H04L 12/715*  (2013.01)
  *H04L 12/743*  (2013.01)
  *H04L 12/747*  (2013.01)

(52) U.S. Cl.
  CPC ............ *H04L 45/64* (2013.01); *H04L 45/742* (2013.01); *H04L 45/745* (2013.01); *H04L 45/7453* (2013.01)

(56) References Cited

U.S. PATENT DOCUMENTS

2013/0204961 A1* 8/2013 Fliam ................. H04L 67/2885
                     709/214
2013/0272305 A1* 10/2013 Lefebvre ............... H04L 45/302
                     370/392

OTHER PUBLICATIONS

Fan, Li, Pei Cao, Jussara Almeida, and Andrei Z. Broder, "Summary Cache: A Scalable Wide-Area Web Cache Sharing Protocol", IEEE/ACM Transactions on Networking, vol. 8, No. 3, Jun. 2000.*
Yu, et al., "Scalable Flow-Based Networking with DIFANE," SIGCOMM '10, Aug. 30-Sep. 3, 2010, 12 pages.
Curtis, et al., "DevoFlow: Scaling Flow Management for High-Performance Networks," SIGCOMM '11, Aug. 15-19, 2011, 12 pages.

\* cited by examiner

SCALABLE NAME-BASED CENTRALIZED CONTENT ROUTING

CROSS-REFERENCE TO RELATED APPLICATIONS

The present application claims priority to U.S. Provisional Patent Application 61/862,320, filed Aug. 5, 2013 by Cedric Westphal, and entitled "Scalable Name-Based Centralized Content Routing", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Information Centric Network (ICN) is a type of network architecture that focuses on information delivery. ICNs may also be known as content-aware, content-centric, or data oriented networks. ICNs may shift the Internet Protocol (IP) communication model from a host-to-host model to an information-object-to-object model. The IP host-to-host model may address and identify data by storage location (e.g. host IP address), whereas the information-object-to-object model may employ a non-location based addressing scheme that is content-based. Information objects may be the first class abstraction for entities in an ICN communication model. Some examples of information objects may include content, data streams, services, user entities, and/or devices. In an ICN, information objects may be assigned with non-location based names, which may be used to address the information objects, decoupling the information objects from locations. Routing to and from the information objects may be based on the assigned names. ICN may provision for in-network caching, where any network device or element may serve as a temporary content server, which may improve performance of content transfer. However, ICN may introduce new challenges. For example, the number of contents in the today's Internet may be in the order of about $10^{15}$, routing by name may mean keeping track of the $10^{15}$ items in the Internet, and in-network caching may result in one item corresponding to multiple locations. As such, an efficient routing scheme may improve delivery latency and network efficiency.

SUMMARY

In one embodiment, a network element (NE) comprising a receiver configured to receive a content request message from a client node via a network, wherein the content request message comprises an identifier of a data object, a memory configured to store a content routing table comprising a plurality of local routing entries for popular data objects, and a content indicator indicating a plurality of less popular data objects that are not associated with the local routing entries, a processor coupled to the memory and configured to check the content routing table for an entry associated with the requested data object, and check the content indicator for a match between the requested data object and the less popular data objects when the content routing table does not comprise the entry, and a transmitter coupled to the processor and configured to send a route request message to a network controller when the content indicator check returns a positive match.

In another embodiment, a method for content-based routing in a software defined network (SDN) receiving a content request message from a client node via the network, wherein the content request message comprises an identifier of a data object, checking a content routing table for an entry associated with the requested data object, wherein the content routing table comprises a plurality of routing rules for a plurality of popular data objects, checking a data set indicator that indicates less popular data objects in order to determine whether the requested data object is a member of the data set indicator when the content routing table does not comprise the entry, and querying a network controller for a route destination location when the requested data object is a member of the data set indicator.

In yet another embodiment, an apparatus comprising a processor configured to classify a plurality of data objects in a network according to popularity, wherein the popularity comprises a measure of data objects' access frequencies in the network, compute a set of long-term routing rules for a popular set of data objects, and generate a content indicator to indicate a less popular set of data objects comprising lower access frequencies than the popular set of data objects, and a transmitter coupled to the processor and configured to send a route configuration message comprising the long-term routing rules to a content router in the network, and send a content indication message comprising the content indicator to the content router.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
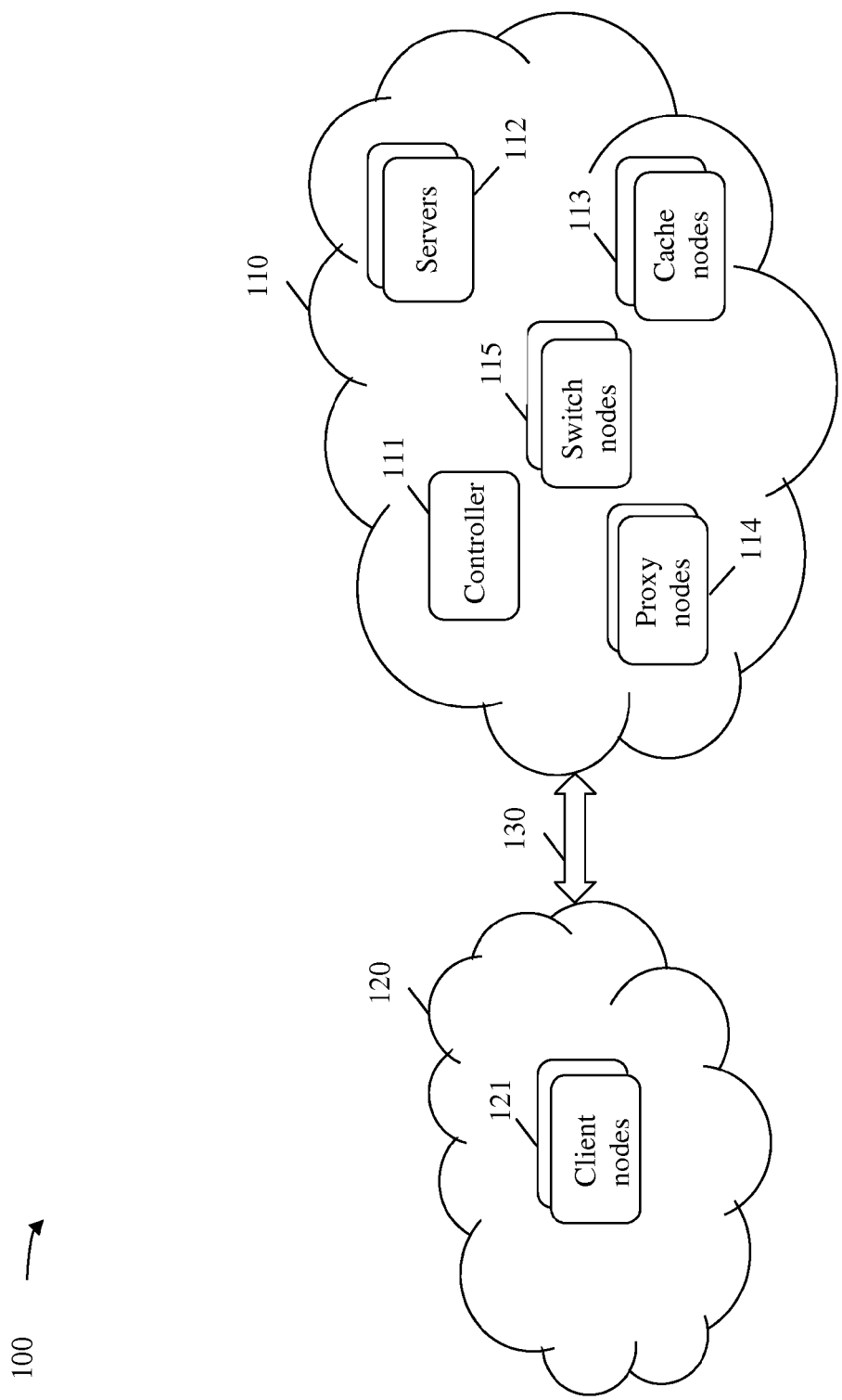
FIG. 1 is a schematic diagram of an embodiment of a content-based SDN.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Internet may have shifted from a communication network to a content consumption and distribution network. Content routing may enable consumers to locate copies of the desired contents. Content routing may be IP-based and may be determined without differentiating content types. A user may request a specific content by resolving a uniform resource locator (URL) of a server that host the specific content into an IP address (e.g. via a domain name system (DNS) or a centralized network controller). The server may host various types of contents, which may include both popular contents (e.g. frequently accessed) and/or unpopular contents (e.g. not frequently accessed). The popular contents may be cached in the network (e.g. from previous requests). Thus, the server may redirect a popular content request to a cache near the end user and may directly serve an unpopular content request. The resolving of a URL to a server and then to an IP address may lead to multiple redirections and inefficiency in content delivery. Conversely, the server's URL may be resolved to the cache such that the popular content may be served by the cache without redirection, but the unpopular content may be redirected to the server. The redirecting of the unpopular content may cause the unpopular content to be served not only by a server further away, but may also further delay the delivery by searching for the unpopular content in a cache hierarchical system. In addition, the content request process may resemble a fat-tailed type distribution (e.g. deviation from a mean), which may cause unpopular content requests to consume a significant portion of the Internet bandwidth.

Some networking paradigms may improve content delivery efficiency by employing different routing schemes and/or network architectures. For example, Content Centric Networks (CCNs) and/or ICNs may route content based on names instead of locations. As such, a content request may be directed by a routing system to a nearby copy of the content (e.g. instead of redirecting from the origin server). However, content namespace may be large. For example, the number of contents in Internet may be estimated to be in the order of about $10^{15}$. Thus, in order for the routing system to handle such a large namespace, the routing system may have to be equipped with large routing tables. Many routers and/or switches may be equipped with routing tables that may store prefixes in the order of about $10^6$. As such, the routing tables may have to increase by almost about ten orders of magnitude in order to accommodate the large namespace when employing name-based routing, and thus may not be suitable for scaling.

Another example may be SDNs in which data forwarding (e.g. in a forwarding plane) may be decoupled from control decisions (e.g. in a control plane), such as routings, resource allocations, etc. As such, more powerful network resources may be allocated separately for control functions, for example, to enable more extensive and/or advanced route computations to provide more efficient content delivery. For example, a centralized network controller (e.g. a SDN controller) may manage and control a global view of a network topology, compute routing paths through the network, and configure flows (e.g. route paths) in routers and/or switches to direct data forwarding in the network. However, the centralizing of all control decisions at a centralized network controller (e.g. route computation for every request) may lead to heavy computational load and traffic at the controller, and thus may limit scalability.

Disclosed herein is a scalable content-based routing scheme in which a centralized (e.g. logical) network controller may distribute content routing rules to content routing elements (e.g. routers and/or switches) and offload traffic at the centralized network controller. The centralized network controller may manage contents and/or content caching locations and/or determine content routing rules such that content requests may be routed to the most suitable locations. The centralized network controller may also aggregate knowledge of content requests in the network when determining content caching locations, and/or content routing rules. Internet traffic patterns may be similar to a Zipf distribution, where a large portion of Internet traffic may carry name requests for a small number of contents. For example, many end users may request the same popular contents. Thus, the centralized network controller may classify contents based on popularity levels and may distribute content routing rules and content forwarding rules to the content routing elements according to the content classifications. For example, the centralized network controller may divide contents into three categories. The first category may refer to popular contents (e.g. high popularity) that are frequently accessed by end users. The second category may refer to less popular contents (e.g. medium popularity) that are less frequently accessed by end users. The third category may refer to unpopular contents (e.g. low popularity) that are rarely accessed by end users. The centralized network controller may pre-configure static routing rules for popular contents in content routing elements in advance. The centralized network controller may resolve locations for less popular contents upon requests by indicating a set of less popular contents to the content routing elements. The centralized network controller may not define any specific routing rules for unpopular contents. As such, when a content routing element receives a popular content request, the content routing element may route the popular content requests according to the pre-configured static rules directly towards a network cache (e.g. replicated copies of the popular content). When a content routing element receives a less popular content request, the content routing element may request the centralized network controller to resolve a location for the less popular request. When a content routing element receives an unpopular content request, the content routing element may forward the unpopular contents via a default path (e.g. towards the unpopular content's origin server). The distribution of routing rules may enable a content routing element to route content requests without invoking a centralized network controller for every content request, and thus may reduce traffic load at the centralized network controller. It should be noted that in the present disclosure, static routing rules may refer to long-term routing rules (e.g. fixed for about one or more days).

The disclosed embodiments may provide mechanisms to optimize content routing and content caching over an administrative domain and may be scalable to support the increasing number of named content in the Internet. The disclosed content-based routing scheme may extend OpenFlow (OF) mechanisms to enable content routing in CCNs by leveraging popularity laws for content request distribution. The disclosed embodiments may reduce the amount of traffic at the centralized network controller by about 97 percent (%) in some traffic scenarios. The reduced traffic may enable a centralized network controller to manage content routing and content caching over resources of a network administrative domain and may provide scalable communication mechanisms between the centralized network controller and content routing elements.

FIG. 1 is a schematic diagram of an embodiment of a name-based SDN 100. The network 100 may be an end-to-end content distribution network comprising one or more networks (e.g. autonomous systems) and/or network domains (e.g. administrative domains). For example, network 100 may comprise a service provider network 110 and a client network 120. The service provider network 110 may be communicatively coupled to the client network 120 via a network connection 130. The connection 130 may include physical and/or logical connections, such as fiber links, optic links, wireless links, and/or electrical links, etc. The connection 130 may comprise a single link, a series of parallel links, a plurality of interconnected nodes, and/or various combinations thereof used to transport data between network 110 and network 120. The network 110 may serve one or more client nodes 121 located in the network 120. A client node 121 may be any device configured to act as an end user and may consume services and/or contents provided by the network 110. In some embodiments, networks 110 and 120 may be in a same network and/or operate under a same network administrative domain. In some embodiments, networks 110 and/or 120 may comprise one or more interconnected networks.

The network 110 may be implemented as a SDN in which network control may be decoupled from forwarding functions. For example, network 110 may comprise a controller 111 and a plurality of network nodes and/or elements, such as one or more servers 112, one or more cache nodes 113, one or more proxy nodes 114, and/or one or more switch nodes 115. The controller 111 may be any device configured to manage and/or control the network elements in the network 110 (e.g. under an administrative domain), for example, via an OF communication protocol. The controller 111 may perform SDN functions, such as managing and maintaining network topologies for the network 110, determining network paths through the network 110, configuring flow tables comprising the network paths in the network elements (e.g. switch nodes 115 and/or the proxy nodes 114), and/or managing network resources to dynamically adapt to changes in network conditions and/or deployments. In some embodiments, the controller 111 may be a centralized logical entity distributed across one or more network nodes. In some other embodiments, the controller 111 may be implemented as a network control module within a virtual machine (VM).

A server 112 may be any device configured to host and/or serve content in the network 110. For example, a server 112 may be a content publisher (e.g. originator of the content). A cache node 113 may be any device that comprises a local data storage configured to store copies of contents (e.g. on-demands or explicitly replicated) served by any of the servers 112. A switch node 115 and/or a proxy node 114 may be any device configured to route and/or forward data according to some routing paths configured by the controller 111. It should be noted that the sever 112, the cache nodes 113, the proxy nodes 114, and/or the switch nodes 115 may all participate in the forwarding functions as directed by the controller 111 in the network 110. In some embodiments, the cache nodes 113, the proxy nodes 114, and/or the switch nodes 115 may all be content routing elements.

The networks 110 and/or 120 may leverage ICN content request-reply model with name-based routing and in-network caching for content delivery and/or distribution. The content-centric request-reply model may operate on two primitives, an interest and a data (e.g. an interest packet may pull a data packet). In name-based routing, each data may be assigned with a unique name (e.g. an identifier comprising a hierarchical structured name) and routing of related information may be performed based on such name, rather than by the location of the data (e.g. host address). An ICN routing element (e.g. cache node 113, proxy node 114, and/or switch node 115) may support in-network caching by including a content store (CS), a pending interest table (PIT), and a forwarding information base (FIB). For example, when an interest packet arrives at an ICN routing element, if the requested data is cached in the CS, the data may be returned directly from the ICN routing element. If the requested data is not in the CS, the routing element may record the content name and the arrival interface in the PIT, and then forward the interest packet via an interface identified by a name look-up in the FIB. The in-network caching may enable delivery of the content from a geographically nearby ICN routing element that holds a copy of the requested content, and thus may reduce delivery latency and improve bandwidth utilization.

In an embodiment, the controller 111 may manage content caching in addition to SDN control and management functions (e.g. topology management and route path computations). For example, a client node 121 in the network 120 may send a packet (e.g. an interest) comprising a request for content (e.g. a data object) in the network 110. The controller 111 may configure one of the content routing elements in the network 110, such as a proxy node 114, as a designated ingress switch to serve ingress traffic from the network 120. The controller 111 may configure flows to divert traffic from the client node 121 to the proxy node 114. When the proxy node 114 receives the packet, the proxy node 114 may refer to the controller 111 to resolve a location for the requested content. In an embodiment of an IP network, the content request may be a Hypertext Transfer Protocol (HTTP) GET request. In such an embodiment, the proxy node 114 may terminate the Transmission Control Protocol (TCP) connection from the client node 121 and continue to process the content request by performing split TCP or TCP proxy functions. The proxy node 114 may parse the HTTP GET request to identify the requested content and may continue to query the controller 111 for a routing path for the requested content.

Upon receiving the query, the controller 111 may determine whether the requested content is cached in the network 110. If the content is not cached in the network 110, the controller 111 may send a response to the proxy node 114 to indicate a server 112 that serves the requested content. The proxy node 114 may subsequently connect to the server 112 and the server 112 may send a response carrying the requested content to the proxy node 114, for example, routed through a switch node 115. The proxy node 114 may in turn forward the requested content to the client node 121.

The controller 111 may additionally select a cache node 113 to store the content, for example, by configuring flows in the switch node 115 to divert a copy of the content from the server 112 to the cache node 113 while forwarding the requested content to the proxy node 114. It should be noted that the controller 111 may maintain a global state of all caches in the network 110 (e.g. mapping of caches to specific contents).

When the client node 121 requests a content that is previously cached and/or indexed in the network 110 (e.g. at a cache node 113), the controller 111 may send a response to the proxy node 114 indicating the cache node 113 instead of the server 112, such that the content may be served by the cache node 113. For example, the cache node 113 may be geographically closer to the proxy node 114 than the server 112, and thus may reduce delivery latency and provide better network efficiency. In the case when a cache miss occurs (e.g. the cache node 113 overwrites a previously cached contents), the controller 111 may map the content request back to the server 112 and the server 112 may serve the content to the proxy node 114. It should be noted that the proxy node 114 may be transparent to the client node 121 and may multiplex between the server 112 and the cache node 113.

Figure 2:
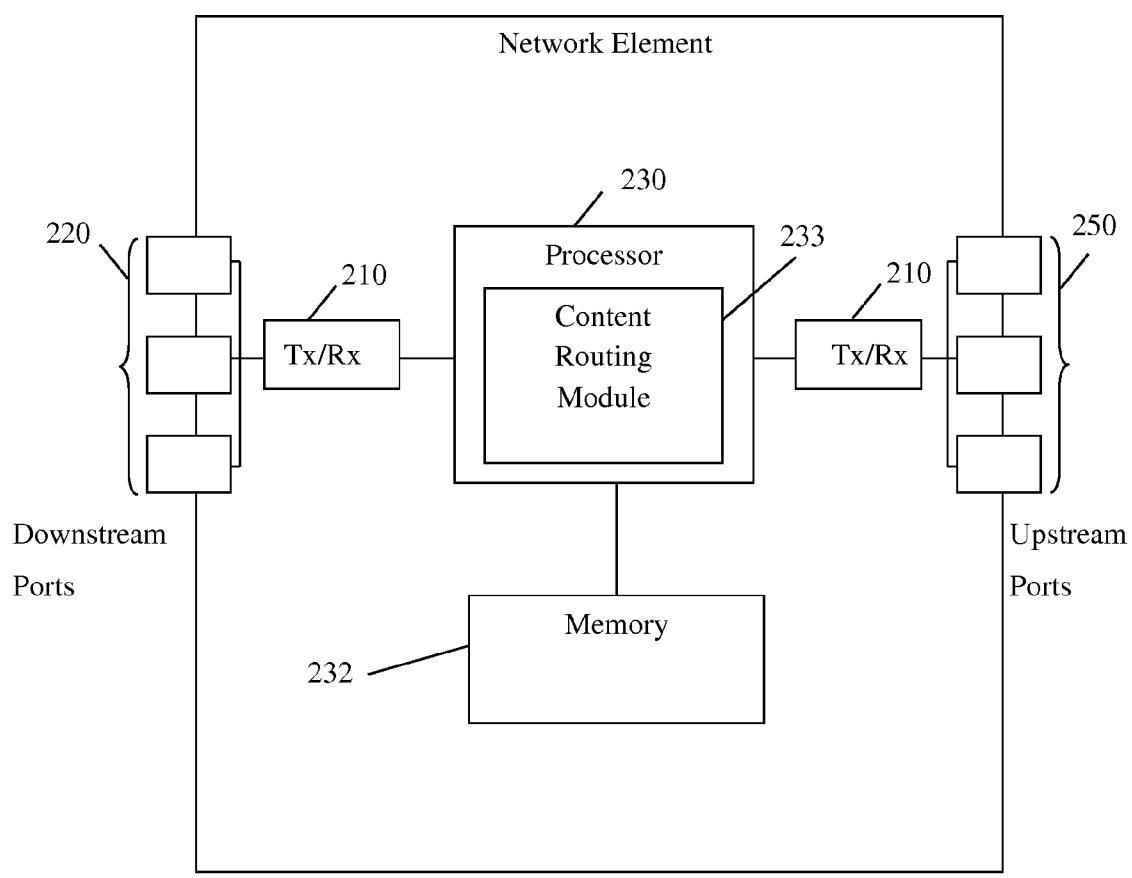
FIG. 2 is a schematic diagram of an embodiment of an NE, which may act as a node in a content-based SDN.

FIG. 2 is a schematic diagram of an example embodiment of an NE 200, which may act as a node in a name-based SDN (e.g. SDN 100). For instance, the NE 200 may be a content router and/or switch (e.g. proxy nodes 114, switch nodes 115, and/or cache nodes 113), a controller (e.g. controller 111), and/or any network nodes in a name-based SDN. NE 200 may be configured to implement and/or support the content routing mechanisms described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a content routing module 233, which may implement content routing methods 400 and/or 600, content statistics reporting method 500, as discussed more fully below, and/or any other method discussed herein. In an alternative embodiment, the content routing module 233 may be implemented as instructions stored in the memory devices 232, which may be executed by the processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
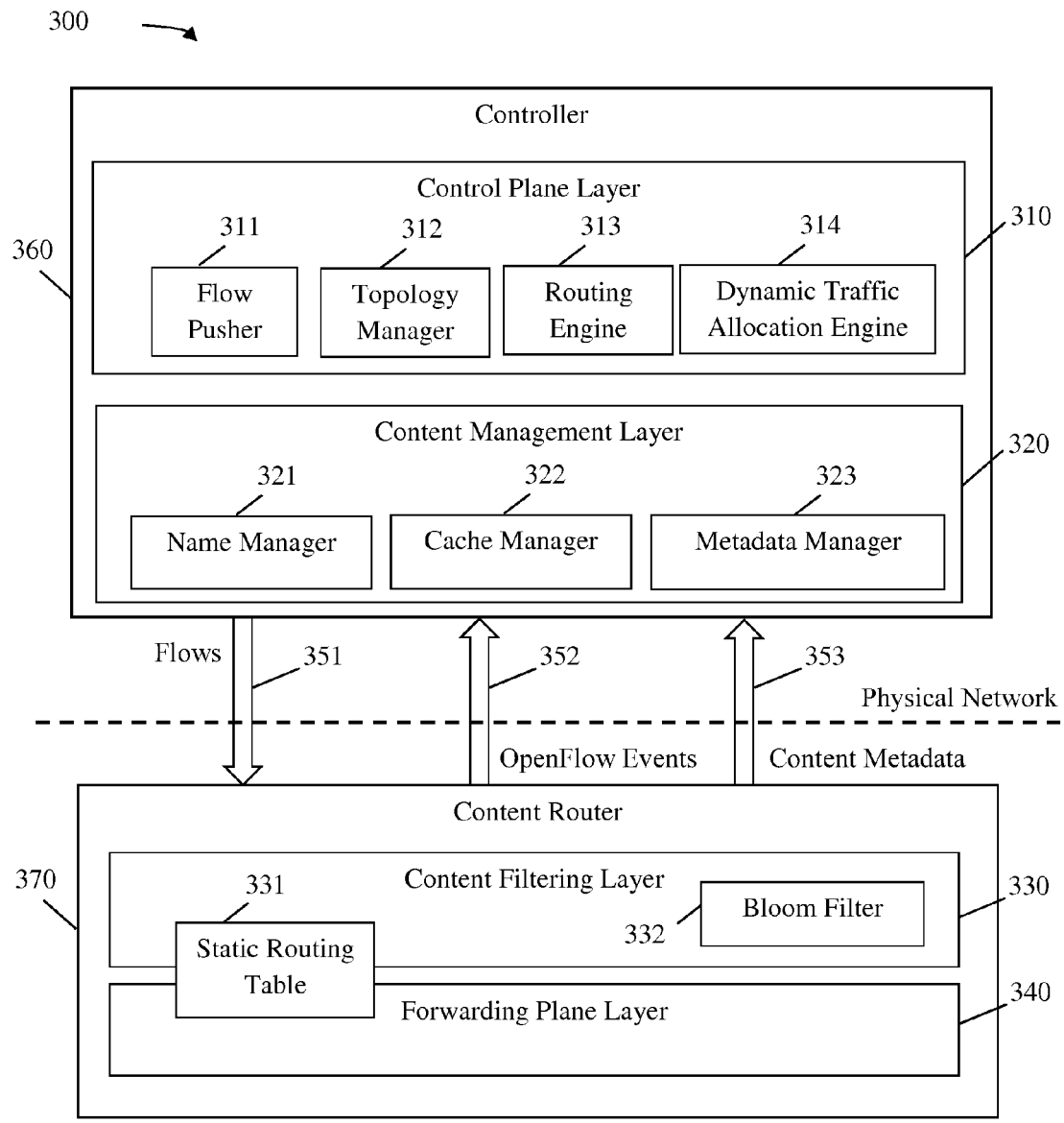
FIG. 3 is a schematic diagram is an embodiment of an architectural view of a content-based SDN.

FIG. 3 is a schematic diagram is an embodiment of an architectural view of a content-based SDN 300, such as network 100. Network 300 may comprise a controller 360 (e.g. controller 111) and a content router 370 (e.g. proxy node 114, switch node 115, and/or cache node 113). The controller 360 and the content router 370 may communicate via flows 351, OpenFlow events 352, and/or content metadata 353 through the network 300. For example, the flows 351 may carry configurations (e.g. network forwarding paths) for the content router 370, the OpenFlow events 352 may carry events (e.g. statistic reports) that occur at the content router 370, and the content metadata 353 may carry content attributes (e.g. content prefix sizes).

The controller 360 may comprise a control plane layer 310 and a content management layer 320. The control plane layer 310 may be substantially similar to a SDN control plane. For example, the control plane layer 310 may comprise a flow pusher 311, a topology manager 312, a routing engine 313, and a dynamic traffic allocation engine 314. The topology manager 312 may be configured to manage, build, and maintain a global network topology view of the network 300, for example, networks nodes (e.g. content router 370, switch nodes 115, proxy nodes 114, cache nodes 113, server nodes 112, etc.) and corresponding interconnections. The routing engine 313 may be configured to compute forwarding paths and determine the best paths (e.g. flows) through the network 300. The flow pusher 311 may be configured to push the paths for flows to the content router 370. The dynamic traffic allocation engine 314 may be configured to dynamically allocate network resources to transport traffic in the network 300 and may adapt to changes in network conditions and/or network deployments.

The content management layer 320 may be an augmented layer to the control plane layer 310. The content management layer 320 may manage contents, content caching, and content routing rules in the network 300 in addition to the SDN control and management functions performed in the control plane layer 310. For example, the content management layer 320 may comprise a name manager 321, a cache manager 322, and a metadata manager 323. The name manager 321 may be configured to manage contents, contents' identifications, contents' naming, and/or content semantics (e.g. mappings to TCP/IP semantics in an IP-based network). The cache manager 322 may be configured to manage and control contents for caching, content caching locations, and/or content request statistics in the network 300. The metadata manager 323 may be configured to track and maintain attributes and/or any other auxiliary data (e.g.

length of content prefixes, etc.) associated with the contents tracked and/or monitored by the controller 360 (e.g. at the name manger).

In an embodiment, the cache manger 322 may classify contents according to some popularity measures, determine the types of contents for caching and/or caching locations, and/or determine content routing rules (e.g. operate in conjunction with routing engine 313 in the control plane layer 310) according to the popularity measures. For example, the cache manager 322 may classify content popularities into three categories. The first category may include popular contents that are frequently accessed by end users. The second category may include less popular contents that are occasionally accessed by end users. The third category may include unpopular contents that are rarely accessed by end users. The cache manager 322 may also update popularity classification of contents and/or re-allocate caches and/or re-distribute content routing rules, for example, according to statistics of content request and/or access frequencies. For example, when a content becomes popular, the content request frequency may increase or conversely when a content becomes less popular, the content request frequency may decrease. The cache manager 322 may determine appropriate content request frequency thresholds for content classifications.

The content router 370 may comprise a forwarding plane layer 340 and a content filtering layer 330. The forwarding plane layer 340 may be substantially similar to a SDN forwarding plane in which data forwarding is performed according to flow tables configured by the controller 360. The content filtering layer 330 may be an augmented layer to the forwarding plane layer 340 and may interact with the content management layer 320 in the controller 360 for content routing. The content filtering layer 330 may filter incoming content requests from clients (e.g. client nodes 121) prior to directing the forwarding plane layer 340 to forward the requests. For example, the content router 370 may include a static routing table 331 (e.g. an ICN FIB) located across both the forwarding plane layer 340 and the content filtering layer 330 and a bloom filter 332 located in the content filtering layer 330. The static routing table 331 may comprise a plurality of routing rules (e.g. local rules) for a first content type (e.g. popular contents). The bloom filter 332 may be configured as a content indicator to indicate contents of a second content type (e.g. less popular contents) different from the first content type. For example, the bloom filter 332 may comprise encoded hashed content names for the second content type. The content filtering layer 330 may direct the forwarding plane layer 340 to forward content requests that are different from default routing paths based on filtering results.

In an embodiment, the controller 360 may pre-configure (e.g. via flows 351) content routing table 331 with static routing rules (e.g. towards cache nodes 113) for popular contents in advance to enable the content router 370 to forward popular content requests directly towards network caches. The controller 360 may resolve locations for less popular contents upon requests. For example, the controller 360 may send a content indicator (e.g. a bloom filter 332 via flows 351) to the content router 370 to indicate the less popular contents such that the content router 370 may query the controller 360 for content location resolution upon receiving a request for a less popular content. The controller 360 may not provide any routing rules for unpopular contents, and thus the content router 370 may forward unpopular content requests via default paths (e.g. towards contents' origin servers).

When the content router 360 receives an incoming request for a content, the content filtering layer 330 may process the request prior to passing the request to the forwarding plane layer 340. The content filtering layer 330 may check the request against the static routing table 331 to find an entry associated with the requested content. If an entry is found in the static routing table 331, the content filtering layer 330 may direct the forwarding plane layer 340 to route the request according to the routing rule in the entry (e.g. towards a cache node 113).

If an entry is not found in the static routing table 331, the content filtering layer 330 may check the request against the bloom filter 332 to determine whether the requested content matches one of the less popular contents in the bloom filter 332. If a match is found, the content filtering layer 330 may send a query to the controller 360 to request the controller 360 to resolve a location for the request. In response to the request, the controller 360 may return a forwarding path. After receiving the forwarding path, the content filtering layer 330 may direct the forward plane layer 340 to forward the request according to the received forwarding path. If a match is not found in the bloom filter 332, the content filtering layer 330 may forward the request according to a default path (e.g. a default IP route for IP-based network or towards an origin server of the contents for CCN). It should be noted that when the content router 370 receives the requested content, the content router 370 may additionally cache the received content in a local cache (e.g. temporary memory storage).

In addition to filtering content requests, the content filtering layer 330 may collect statistics of content requests (e.g. request frequencies) and/or contents that are cached in the content router 370's local storages. The content filtering layer 330 may send statistic reports (e.g. in OpenFlow events 352) to the controller 360 periodically. The statistic reports may enable the controller 360 to manage contents in the network and/or update content routing rules accordingly.

It should be noted that the controller 360 and/or the content router 370 may employ a different type of content indicator (e.g. a hash table, a counting bloom filter, etc.) than a bloom filter to indicate and/or track the less popular contents in the network 300. However, a bloom filter may provide a space (e.g. memory storage) efficient probabilistic mechanism for tracking and testing elements in a substantially large data set, but at a cost of possible false positives (e.g. falsely identify an element in a data set). For example, a bloom filter may carry encoded hashed data in a bit vector. The bloom filter may begin with zero valued bits. An element may be added by applying k hash functions to the element to generate k bit positions in the bit vector and setting the bits to ones. To test whether an element is in a set, the element may be hashed k times (e.g. applying the k hash functions) to obtain k bit positions and checking corresponding bit values. If any of the bits comprises a value of zero, the element is definitely not a member of the set. Otherwise, the element is in the set or a false positive.

Figure 4:
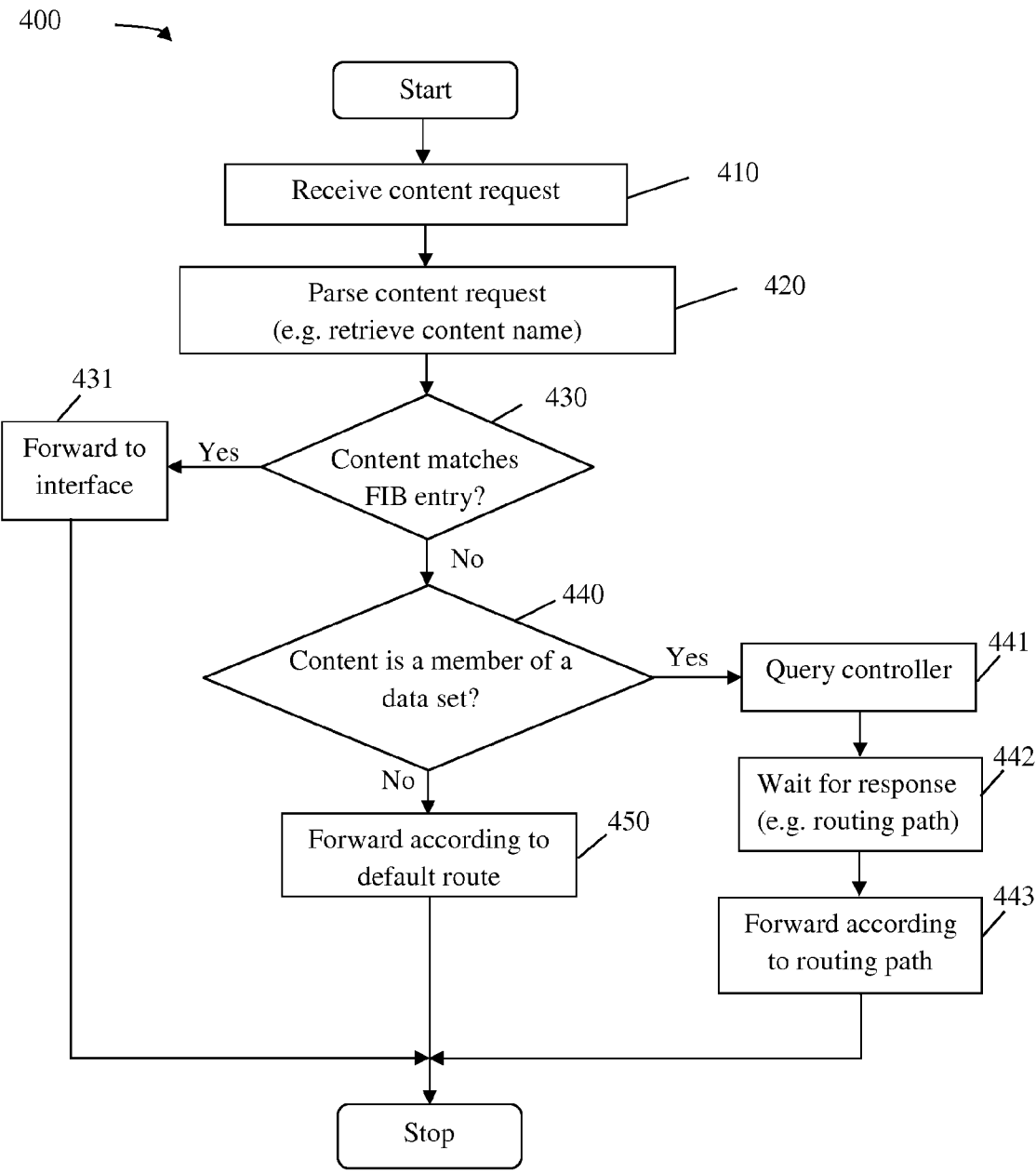
FIG. 4 is a flowchart of an embodiment of a method for content routing.

FIG. 4 is a flowchart of an embodiment of a method 400 for content routing, which may be implemented in a content routing element, such as content router 370, proxy node 114, switch node 115, cache node 113, and/or NE 200. Method 400 may begin with receiving a content request from a client (e.g. client node 121) at step 410. At step 420, upon receiving the content request, method 400 may parse the request to identify the requested content (e.g. content name). At step 430, method 400 may determine whether the requested content (e.g. a content name identifier) is associated with an entry in a FIB (e.g. local rules pre-configured in a static routing table 331). For example, the FIB may comprise a set of static routing rules (e.g. for directing popular contents towards network caches) pre-configured by a controller (e.g. controllers 111 and/or 360). If an entry is found, method 400 may proceed to step 431. At step 431, method 400 may forward the content request to the interface indicated in the entry. For example, the interface may direct the request towards a network cache (e.g. cache node 113) that holds a replicated copy of the requested content.

If an entry is not found in the FIB at step 430, method 400 may proceed to step 440. At step 440, method 400 may determine whether the requested content is in a set of contents (e.g. less popular contents) represented by a data set indicator (e.g. a bloom filter 332). If the data set indicator returns a positive match (e.g. a member of the data set), method 400 may proceed to step 441. At step 441, method 400 may query the controller for a routing rule (e.g. remote routing rule) for the requested content. At step 442, method 400 may wait for a response (e.g. routing path) from the controller. At step 443, upon receiving a response from the controller, method 400 may forward the content request according to the received routing path. It should be noted that the received routing path may or may not direct the request towards a network cache since the contents indicated by the data set indicator may be cached in the network for a short-term (e.g. about one or more hours) and the cache may be overwritten by other contents. For example, a controller may allocate some amount of caches in the network for storing popular contents and may cache less popular contents in the remaining cache space according to some caching policies (e.g. Least Frequently Used (LFU), Least Recently Used (LRU), etc.).

If the data set indicator returns a negative match (e.g. not a member of the data set) at step 440, method 400 may proceed to step 450. At step 450, method 400 may forward the content request according to a default route towards an origin server of the requested content. It should be noted that the controller may pre-configure static routing rules in the FIB for popular contents and may indicate less popular contents in the data set indicator. When the network is in a steady state, method 400 may most likely find an entry in the FIB when the request is for a popular content. Method 400 may or may not find an entry in the FIB when the request is for a less popular content and may most likely find a match in the data set indicator. Method 400 may be unlikely to find an entry in the FIB or a match in the data set indicator when the request is for an unpopular content. However, the content routing element may route a content request by filtering the content request first by the FIB and then by the data set indicator without specifically determining the popularity level of the requested content.

As shown above, a content router (e.g. content router 370 or proxy node 114) may not invoke a controller (e.g. controller 111 or 360) for every content request. As such, the routing load and/or traffic may be offloaded from the controller and may be distributed to content routers, and thus may improve delivery and/or network efficiency. The improvement may be further characterized by applying a Zipf distribution to the content popularity with a few assumptions. For example, the assumptions may include setting the Zipf distribution exponent factor to a value of about one (e.g. suitable for Internet traffic), assuming the number of contents in category one (e.g. popular contents) and category two (e.g. less popular contents) to be about equal, and assuming a category one hit rate of about 33% with an alphabet of about $10^9$ content items. Based on such assumptions, the category two hit rate may be about 3.3%. As such, the disclosed content routing scheme may route about 33% of content requests directly to corresponding caches by static routing rules, invoke the controller for about 3.3% of the content requests, and route the remaining about 62% of the content request directly to the origin server. Thus, the disclosed content routing scheme may be scaled to support name-based routing for the increasing number of content items in the Internet.

Figure 5:
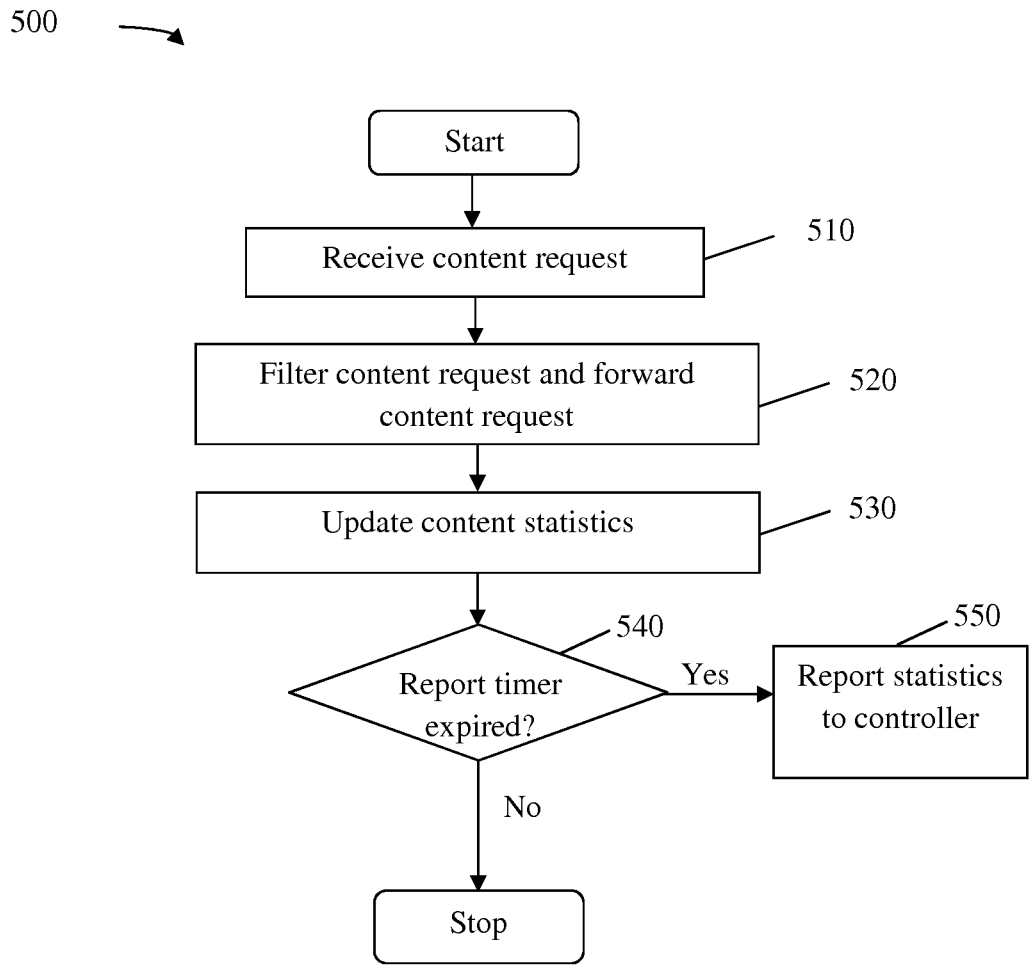
FIG. 5 is a flowchart of an embodiment of a method for reporting content statistics.

FIG. 5 is a flowchart of an embodiment of a method 500 for reporting content statistics, which may be implemented in a content routing element, such as content router 370, proxy node 114, switch node 115, cache node 113, and/or NE 200. Method 500 may begin with receiving a content request from a client (e.g. client node 121) at step 510. At step 520, method 500 may filter the content request and forward the content request according to the filtering result by employing substantially similar mechanisms as described in method 400. At step 530, method 500 may update content statistics (e.g. content access frequency). At step 540, method 500 may determine whether a report timer has reached an expiration time. If the report timer is expired, method 500 may proceed to step 550. At step 550, method 500 may send a report comprising the updated content statistics to a controller (e.g. controller 111 and/or 360). Method 500 may also include local cache information (e.g. the stored contents) in the report. It should be noted that the report may enable the controller to update content caching locations, content routing rules, and/or content classification. In addition, the operations depicted in method 500 may be performed in the order shown or in any other suitable order.

Figure 6:
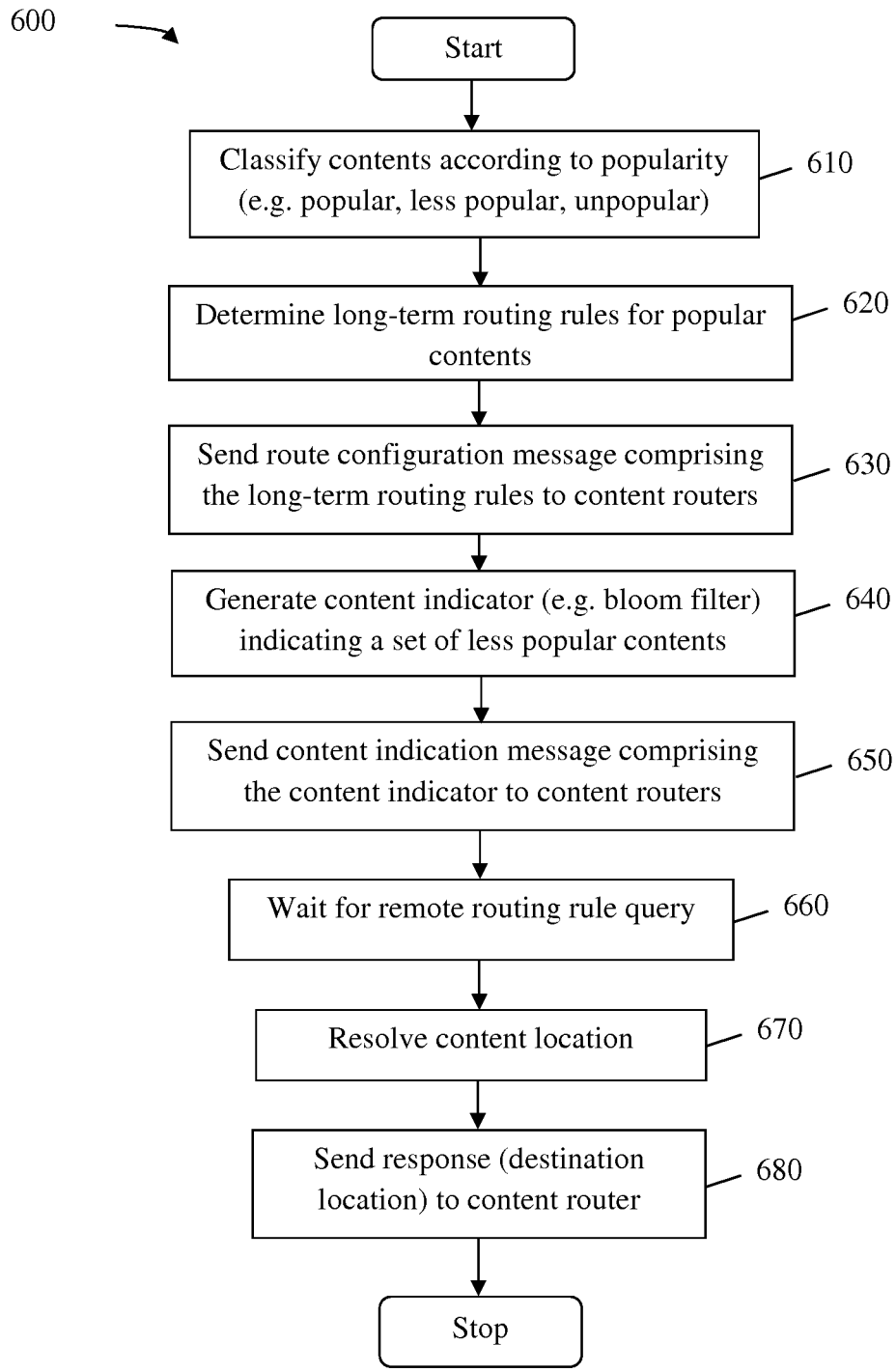
FIG. 6 is a flowchart of an embodiment of another method for content routing.

FIG. 6 is a flowchart of an embodiment of another method 600 for content routing, which may be implemented in a centralized network controller, such as controller 111 and/or 360, and/or NE 200. Method 600 may begin with classifying contents in a network into three categories, popular, less popular, and unpopular in step 610. For example, popular contents may refer to contents that are accessed frequently in the network, less popular contents may refer to contents that are occasionally accessed in the network, and unpopular contents may refer to contents that are rarely accessed in the network. The popular contents may be cached in the network for a long-term (e.g. about one or more days). The less popular contents may be cached in the network for a short term (e.g. about one or more hours). After classifying the contents, at step 620, method 600 may determine a set of static routing rules (e.g. long-term routing rules) for the popular contents. At step 630, method 600 may send a route configuration message comprising the long-term routing rules (e.g. flows) to content routers (e.g. proxy node 114, switch node 115, and/or content router 370) in the network.

At step 640, method 600 may generate a content indicator (e.g. bloom filter 332) to indicate a set of less popular contents in the network. At step 650, method 600 may send a content indication message comprising the content indicator to the content routers.

At step 660, method 600 may wait for a remote routing rule query. For example, a content router may receive a request for a content that is in the content indicator, and thus may query for a route for forwarding the request. At step 670, upon receiving the query, method 600 may resolve the content to a destination location, which may be a cache in the network or an origin server of the requested content depending on the cache state of the network at the time of the request. At step 680, method 600 may send a response comprising the resolved destination location to the content router. Method 600 may be repeated for the duration of network operation. It should be noted that method 600 may update and/or re-classify a content as the content becomes more popular or less popular (e.g. based on statistic reports received from content routers) and/or re-distribute content routing rules accordingly.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network element (NE) configured to operate in a content centric network, comprising:
a receiver configured to receive a content request message from a client node via the content centric network, wherein the content request message comprises a content name of a data object;
a memory configured to store:
a content routing table comprising a plurality of local routing entries for a plurality of popular data objects; and
a content indicator indicating a plurality of less popular data objects that are not associated with the local routing entries, wherein the content indicator is a bloom filter used to determine whether requested content is in a set of the less popular data objects;
a processor coupled to the memory and configured to:
check the content routing table for an entry associated with the content name of the requested data object; and
check the content indicator for a match between the content name of the requested data object and the less popular data objects when the content routing table does not comprise the entry; and
a transmitter coupled to the processor and configured to:
send a route request message to a network controller when the content indicator check returns a positive match;
transmit the requested data object through the content centric network based on the content name; and
forward the content request message according to a default routing rule that directs the content request message towards a network node comprising an original copy of the requested data object when the content indicator check returns a negative match indicating that the requested data object corresponds to unpopular data objects.

2. The NE of claim 1, wherein the receiver is further configured to receive a plurality of pre-determined routing rules for the popular data objects from the network controller prior to receiving the content request message, wherein the memory is further configured to store the pre-determined routing rules in the local routing entries, and wherein the transmitter is further configured to forward the content request message according to the entry when the content table comprises the entry.

3. The NE of claim 2, wherein the entry directs the content request message towards a network node that comprises a replicated copy of the requested data object.

4. The NE of claim 1, wherein the receiver is further configured to:
receive the content indicator from the network controller; and
receive a remote routing rule for the requested data object from the network controller subsequent to sending the route request message, and
wherein the transmitter is further configured to forward the content request message according to the received remote routing rule.

5. The NE of claim 1, wherein the bloom filter comprises encoded hashed information of the less popular data objects.

6. The NE of claim 1, wherein the processor is further configured to:
update content statistics upon receiving the content request message, wherein the content statistics comprises a content access frequency of the requested data object; and
generate a report comprising the content statistics, and wherein the transmitter is further configured to send the report to the network controller.

7. The NE of claim 1, wherein the receiver is further configured to receive the requested data objects, wherein the memory is further configured to cache the received data objects, wherein the processor is further configured to generate a report comprising information associated with the cached data objects, and wherein the transmitter is further configured to send the report to the network controller.

8. The NE of claim 1, wherein the content routing table is a forwarding information base (FIB).

9. A method for content-based routing in a software defined content centric network:
receiving a content request message from a client node via the software defined content centric network, wherein the content request message comprises a content name of a data object;
checking a content routing table for an entry associated with the content name of the requested data object, wherein the content routing table comprises a plurality of routing rules for a plurality of popular data objects;
checking a data set indicator that indicates less popular data objects using the content name in order to determine whether the requested data object is a member of the data set indicator when the content routing table does not comprise the entry, wherein the data set indicator is a bloom filter used to determine whether requested content is in a set of the less popular data objects;
querying a network controller for a route destination location when the requested data object is a member of the data set indicator;
forwarding the content request message according to a default route towards a network node that publishes the requested data object when the requested data object is not a member of the data set indicator indicating that the requested data object corresponds to unpopular data objects; and
routing the requested data object through the software defined content centric network based on the content name.

10. The method of claim 9 further comprising:
forwarding the content request message according to the entry when the content table comprises the entry, wherein the entry directs the content request message towards a network cache comprising a replicated copy of the requested data object; and
receiving the routing rules for the popular data objects from the network controller prior to receiving the content request message.

11. The method of claim 9 further comprising:
receiving the data set indicator from the network controller;
receiving a remote routing rule from the network controller subsequent to querying the network controller; and
forwarding the content request message according to the remote routing rule.

12. The method of claim 9 further comprising:
receiving the requested data object;
storing the received data object in a local cache;
updating content statistics upon receiving the content request message, wherein the content statistics comprise a content access frequency of the requested data object and information of the local cache; and
sending a report comprising the content statistics to the network controller.

13. An apparatus comprising:
a memory storing instructions;
a processor coupled to the memory configured to execute instructions to:
classify a plurality of data objects in a content centric network according to popularity, wherein the popularity comprises a measure of data objects' access frequencies in the content centric network;
compute a set of long-term routing rules for a popular set of data objects; and generate a content indicator to indicate a less popular set of data objects comprising fewer access frequencies than the popular set of data objects, wherein the content indicator is a bloom filter used to determine whether requested content is in the less popular set of data objects;
determine an unpopular set of data objects without any specific routing rules; and
a transmitter coupled to the processor and configured to:
send a route configuration message comprising the long-term routing rules to a content router configured to route the data objects through the content centric network based on content name; and
send a content indication message comprising the content indicator to the content router.

14. The apparatus of claim 13, wherein the receiver is further configured to receive a query for a routing rule for a first of the data objects in the less popular set from the content router, wherein the processor is further configured to determine a short-term routing rule for the first data object upon receiving the query, and wherein the transmitter is further configured to send a route response message comprising the short-term routing rule to the content router in response to the query.

15. The apparatus of claim 13, wherein the bloom filter comprises encoded hashed information of the less popular set of data objects.

16. The apparatus of claim 13, wherein the receiver further receives a statistic report comprising data object access frequencies, and wherein the processor is further configured to update the classifying of the data objects in the content centric network.

17. The apparatus of claim 13, wherein the receiver further receives a statistic report comprising local cache information of the content router, and wherein the processor is further configured to update the set of long-term routing rules, the content indicator, or combinations thereof based on the local cache information.

18. The apparatus of claim 13, wherein the content centric network is a software defined content centric network, and wherein the route configuration message and the content indication message are sent via an OpenFlow communication protocol.

* * * * *